United States Patent
Fauteux et al.

[11] Patent Number: 5,846,267
[45] Date of Patent: Dec. 8, 1998

[54] PROCESS FOR FABRICATING ELECTROLYTIC CELL HAVING AN INTERMDIATE SUB-COMPONENT CONNECTING LAYER AND PROCESS

[75] Inventors: Denis G. Fauteux, Acton; Martin Van Buren, Chelmsford, both of Mass.

[73] Assignee: Mitsubishi Chemical Corporation, Japan

[21] Appl. No.: 893,387

[22] Filed: Jul. 11, 1997

Related U.S. Application Data

[62] Division of Ser. No. 754,276, Nov. 20, 1996.

[60] Provisional application No. 60/008,434 Dec. 11, 1995.

[51] Int. Cl.[6] .................................................. H01M 10/38
[52] U.S. Cl. .......................................... 29/623.3; 429/192
[58] Field of Search ............................... 29/623.1, 622.3, 29/622.4; 429/190, 191, 192

[56] References Cited

U.S. PATENT DOCUMENTS

| | | | |
|---|---|---|---|
| 5,030,527 | 7/1991 | Carpio et al. | 429/192 |
| 5,219,681 | 6/1993 | Yamada et al. | 429/192 |
| 5,237,031 | 8/1993 | Kubota et al. | 526/305 |
| 5,240,790 | 8/1993 | Chua et al. | 429/190 |
| 5,300,374 | 4/1994 | Agrawal et al. | 429/192 |
| 5,340,672 | 8/1994 | Kubota et al. | 429/249 |
| 5,382,481 | 1/1995 | Fleischer | 429/192 |
| 5,426,005 | 6/1995 | Eschbach | 429/192 |
| 5,435,054 | 7/1995 | Tonder et al. | 29/623.5 |
| 5,449,576 | 9/1995 | Anani | 429/191 |

FOREIGN PATENT DOCUMENTS 6223877  8/1994  Japan .

*Primary Examiner*—Anthony Skapars
*Attorney, Agent, or Firm*—Factor and Shaftal

[57] ABSTRACT

The present invention is directed to an electrolytic cell and associated process for fabrication, wherein the cell utilizes an intermediate sub-component connecting layer. This layer comprises an electrolyte which, in an at least partially cured state, is at least partially sandwiched between an electrolyte on a first sub-component and an electrolyte on a second sub-component. Prior to full curing of the intermediate sub-component connecting layer, the cell is oriented into a desired product configuration. Once such a configuration is obtained, the intermediate sub-component connecting layer is fully cured to, in turn, maintain the cell in the desired product configuration without concern of misalignment or mechanical degradation between the various sub-components and/or the cell.

7 Claims, 1 Drawing Sheet

PROCESS FOR FABRICATING ELECTROLYTIC CELL HAVING AN INTERMDIATE SUB-COMPONENT CONNECTING LAYER AND PROCESS

This application is a division of application Ser. No. 08/754,276 filed Nov. 20, 1996 which application is now pending depends from Provisional Patent Application Ser. No. 60/008,434 entitled USE OF AN INTERMEDIATE LAYER (TIE-COAT) TO IMPROVE SUB-COMPONENT ADHESION, filed Dec. 11, 1996.

BACKGROUND OF THE INVENTION

1. Field of the Invention

The present invention is directed to electrolytic cells and their fabrication, and, more particularly, to an electrolytic cell with an intermediate sub-component connecting layer which ties together other sub-components, such as an anode and cathode, and which facilitates operative alignment and securement of the sub-components during formation of a desired product configuration, without jeopardizing mechanical integrity of the fully fabricated cell.

2. Background Art

Electrolytic cells fabricated from various sub-components, wherein one of the sub-components is an electrode, are well known in the art. Indeed, in such prior art devices and processes, adhesion between the electrodes and electrolyte is typically accomplished by one of three ways. First, when a liquid electrolyte is utilized in a cell, the cell is maintained under pressure so as to avoid the loss of contact between the sub-components. To maintain such pressure for a round cell, the cell is wound so as to create an inner tension. When a prismatic cell is fabricated, spring loading is utilized to maintain the necessary pressure. Second, when a high temperature polymer electrolyte is used (such as PEO or PVdf), the sub-components are fused together by pressure and heat. Third, when a gel electrolyte is used, the sub-components are placed in contact with each other, and then the electrolyte precursor is polymerized to a monolithic gel electrolyte by for example, UV, EB or heat curing.

Although such prior art does enable attachment of the various sub-components together, several problems nevertheless exist. Specifically, in many cases, the sub-components do not uniformly adhere to each other, thereby resulting in a cell with poor performance capabilities. Furthermore, in such prior art cells, mechanical degradation often occurs when, for example, the cell is bent or rolled into a desired product configuration. Additionally, such bending or rolling also may result in an electrolytic cell having the edges of the electrode misaligned with each other—thereby resulting in poor cell performance and short circuiting.

SUMMARY OF INVENTION

The present invention is directed to an electrolytic cell having an intermediate sub-component connecting layer for facilitating secured operative alignment between the electrodes of the cell. The electrolytic cell includes a first electrolytic sub-component having a first electrolyte applied therewith, and a second electrolytic sub-component having a second electrolyte applied therewith. The intermediate sub-component connecting layer is secured to the first and second electrolytes and may comprise an electrolyte of the same or different composition as that of the first and/or second electrolytes.

In a preferred embodiment of the invention, the intermediate sub-component connecting layer comprises means for enabling rolling/winding and bending of the electrolytic cell without causing mechanical degradation to the electrolytic cell or any of the associated sub-components. As will be explained, after rolling and bending has occurred, the intermediate sub-component connecting layer will be cured so as to maintain the electrolytic cell in the desired product configuration; without the need of additional mechanical aids such as springs or casings. As will be understood, the first and second electrolytic sub-components may comprise an anode and cathode. The use of the term sub-component is due to the fact that such anodes and cathodes may be pre-fabricated to include the current collector, primer, active material and an associated electrolyte.

In another preferred embodiment of the-invention, the intermediate sub-component connecting layer comprises a polymerizable gel electrolyte or a high temperature polymer. Such an electrolyte further includes means for penetrating into the first and second electrolytes to, in turn, promote securement therebetween.

The present invention also contemplates a process for fabricating an electrolytic cell comprising the steps of 1) fabricating the first electrolytic sub-component with a first electrolyte; 2) fabricating a second electrolytic sub-component with a second electrolyte; 3) applying an intermediate sub-component connecting layer, comprising an at most partially cured/polymerized electrolyte (the term cured will be understood to include polymerization), onto one of the first and second electrolytes of the first and second electrolytic sub-components, respectively; 4) attaching the other one of the electrolytic sub-component to the intermediate sub-component connecting layer so that at least a portion of the intermediate sub-component connecting layer is sandwiched between the first and second electrolytes; 5) orientating the electrolytic cell into a desired configuration while enabling relative sliding between the first and second electrolytic sub-components so as to facilitate operative alignment therebetween; and 6) fully curing the intermediate sub-component connecting layer after the desired configuration and alignment have been obtained to, in turn, maintain the electrolytic cell in the desired configuration after such full curing.

In the present process, the step of fabricating the first and second electrolytic sub-components further comprises the step of fabricating at least one of the first and second electrolytic sub-components with an electrolyte which is at most partially cured.

In addition, the process also contemplates the steps of allowing at least a portion of the intermediate sub-component connecting layer to penetrate into at least a portion of the first and second electrolytes prior to the step of fully curing the intermediate sub-component connecting layer; and, curing the at least one of the first and second electrolytes. It is important to note here that the curing of the first and second electrolytes does not need to be accomplished prior to the step of fully curing the intermediate sub-component connecting layer.

The intermediate sub-component connecting layer may include a liquid with polymerizable monomers. Inasmuch as the intermediate sub-component connecting layer is not in a fully cured state, the liquid state will facilitate the desired slidability between the sub-components when trying to achieve a desired product configuration.

BEST MODE FOR CARRYING OUT THE INVENTION

Figure 1:
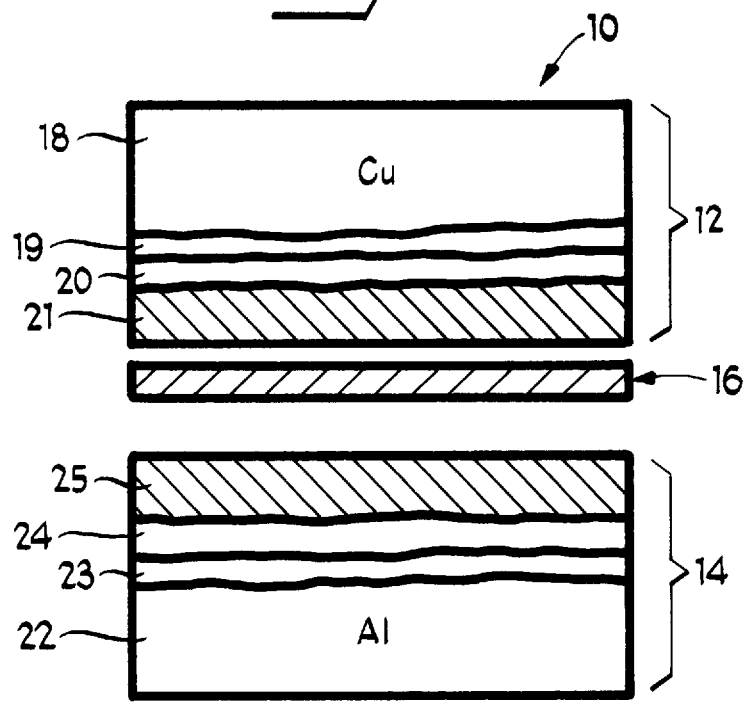
FIG. 1 of the drawings is a schematic diagram of the present electrolytic cell having an intermediate sub-component connecting layer.

While this invention is susceptible of embodiment in many different forms, there is shown in the drawings and will be described in detail, one specific embodiment with the understanding that the present disclosure is to be considered as an exemplification of the principles of the invention and is not intended to limit the invention to the embodiment illustrated.

Electrolytic cell 10 is shown in FIG. 1 as comprising first electrolytic sub-component 12, second electrolytic sub-component 14 and intermediate sub-component connecting layer 16. First electrolytic sub-component 12 includes current collector 18, primer material 19, active material 20 and first electrolyte 21. Although several materials can be used, current collector 18 will be described, for illustration purposes only, as comprising copper, although many other conventional materials, as would be easily understood to those with ordinary skill in the art, are likewise contemplated for use. The same holds true for the particular primer 19 and the active electrode material 20. As will be more fully explained, first electrolyte 21 preferably comprises a gel or high temperature polymer electrolyte.

Second electrolytic sub-component 14 also comprises a current collector 22, primer 23, active material 24 and second electrolyte 25. Again, each of the materials associated with the second electrolytic sub-component are conventionally available and the particular types of materials to be used would be readily understood to those with ordinary skill in the art. However, for the purposes of the present explanation, current collector 22 may comprise aluminum.

Although the term "sub-component" has, and will continue to be used throughout the present Specification, it should be understood that such a term (with respect to sub-components 12 and 14) are representative of a fully fabricated anode (12) and cathode (14); each of which include the previously identified associated primer, active material and electrolyte. Intermediate sub-component connecting layer 16 comprises an electrolyte which can be of the same composition as either first and/or second electrolytes 21, 25, respectively, so long as all of the electrolytes, when associated with each other, exhibit the necessary ionic conductivity required to enable operable performance of cell 10.

Figure 2:
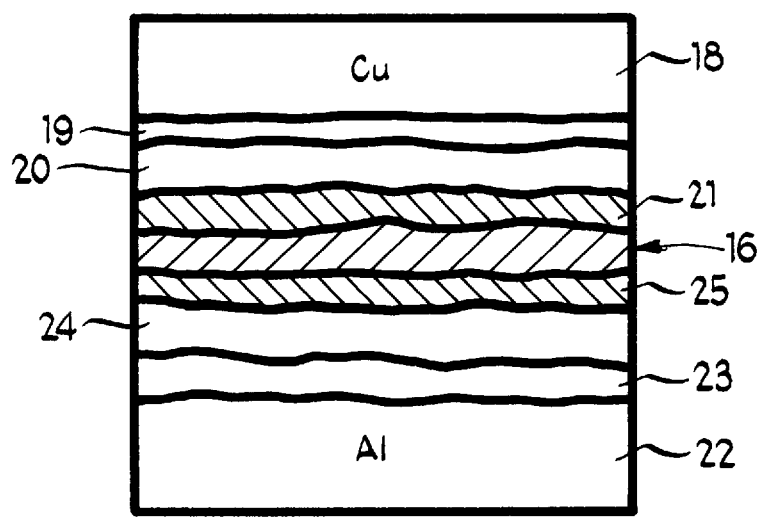
FIG. 2 of the drawings is a schematic diagram of the present electrolytic cell having an intermediate sub-component connecting layer.

Intermediate sub-component connecting layer 16 is shown in FIG. 1 and FIG. 2 as having at least a portion sandwiched between first and second electrolytes 21 and 25, respectively. As will be explained more fully with respect to the process for fabricating electrolytic cell 10, intermediate sub-component connecting layer 16 will be applied to first and second electrolytes 21 and 25, respectively, which are, at most, in a partially cured state. However, even if partially cured, intermediate sub-component connecting layer 16 will remain in a substantially liquid phase after application on to, and sandwiching between first and second electrolytes 21 and 25, respectively. Indeed, the liquid phase of intermediate sub-component connecting layer serves two purposes: 1) it facilitates penetration (See FIG. 2) and, in turn, excellent securement with the first and second electrolytes; and 2) it enables operative slidability to occur relative to the first and second electrolytic sub-components. As will be more fully explained, such slidability enables proper alignment of the edges of the electrolytic sub-components, relative to each other, during (and after) bending or folding of electrolytic cell 10 into a desired configuration. Once the desired configuration is made, intermediate sub-component connecting layer 16, and, if necessary, first and second electrolytes 21 and 25, respectively, will be exposed to final curing which will maintain-electrolytic cell 10 in the desired configuration while also maintaining excellent adhesion between the various sub-components.

With respect to the fabrication of electrolytic cell 10, and as previously explained, it will be assumed that first and second electrolytic sub-components 12, 14, respectively, comprise pre-fabricated electrodes (anode and cathode) with desired current collectors, primers, active materials and electrolytes associated therewith. Again, the particular materials used, and the associated application processes for the elements of the first and second electrodes/electrolytic sub-components, onto the respective current collectors, are conventionally known and understood by those with ordinary skill in the art. However, it is also contemplated that although pre-fabricated sub-components have been identified for use in the present disclosure, that non-pre-fabricated sub-components can also be used and conventionally assembled in accordance with the teachings of the present disclosure.

After the desired sub-components have been selected, intermediate sub-component connecting layer 16, which may comprise a liquid with polymerizable monomers in an at most partially cured state, is then applied onto either first electrolyte 21 or second electrolyte 25. The electrolyte composition of the connecting layer may be the same as that of the first or second electrolyte 21, 25, respectively.

Although the particular composition of the various electrolytes and, more particularly, intermediate sub-component connecting layer 16, are not of great significance to the teaching and understanding of the present invention, it is nevertheless contemplated that a gel or high temperature polymer electrolyte be used. For example, a PC gel electrolyte 16 having the following formulation was used (although, as understood to those with ordinary skill in the art, the present invention is in no way limited to this particular formulation or type of electrolyte):

| PC GEL FORMULATION | g | % |
|---|---|---|
| PC | 117.75 | 78.5 |
| LiAsF$_6$ | 18 | 12.0 |
| PEO | 0.75 | 0.5 |
| PHOTOMER 4050 | 9 | 6.0 |
| PHOTOMER 4158 | 4.5 | 3.0 |
| TOTAL | 150 g | 100.00 |

After using conventional mixing and fabrication techniques, the total viscosity of the PC gel electrolyte was measured at approximately 500 cps. The prepared PC gel was then coated onto first electrolyte 21 (which may, for example, comprise a SPE), and allowed to at least partially penetrate into the first electrolyte (See FIG. 2). After such has occurred, second electrolytic sub-component 14, and in turn second electrolyte 25, was placed over intermediate sub-component connecting layer 16, to, in turn, sandwich at least a portion of it between the first and second electrolytes. As previously stated, although the first and second electrolytes and the intermediate sub-component connecting layer may be in an at most partially cured state, the intermediate sub-component connecting layer will remain in a substantially liquid state relative to the first and second electrolytes to, in turn, facilitate desired slidability of the first and second electrolytic sub-components relative to each other.

After all of the sub-components have been applied to each other (FIG. 2), electrolytic cell 10 can be manipulated into a desired product configuration. Inasmuch as the first and second electrolytic sub-components will slide relative to each other, misalignment (such as edges inadvertently overlapping, or hanging over one another) and mechanical degradation between the various sub-components which would otherwise occur during, for example, folding, bending, rolling and/or winding of the cell, will be avoided. Accordingly, once the desired product configuration has been obtained, intermediate sub-component connecting layer 16, and, if necessary, first and second electrolytes 21, 25, respectively, will be exposed to a "full" curing/polymerization process (as those terms are understood in the art). Once such full curing has occurred, electrolytic cell 10 will be maintained in the desired product configuration, without the need for additional mechanical devices, such as casings or springs. In addition, since the product configuration has occurred before curing of the electrolyte(s), mechanical degradation and loss of adhesion between the various sub-components (which may otherwise occur during folding, bending and/or rolling of an electrolytic cell) is substantially precluded.

As an additional benefit of the present invention, it is further contemplated that when, for example, a stack of electrolytic cells are to be associated with each other (such as in a battery pack), the individual cells can be placed into a box or package prior to curing/polymerization of the electrolyte(s), such as the intermediate sub-component connecting layer. Accordingly, inasmuch as the box or package will have a specific internal geometry, the stacked cells may be configured into a conforming relationship with the internal geometry. After the stacked cells have been placed and properly configured/formed within the box or package, the electrolyte(s) of the stacked cells will then be allowed to cure/polymerize, to, in turn, maintain the configuration of the stacked cells in conformance with the internal geometry of the box or package.

The foregoing description merely explains and illustrates the invention and the invention is not so limited except insofar as the appended claims are so limited, as those having skill in the art who have the present disclosure before them will be able to make modifications and variations therein without departing from the scope of the invention.

What is claimed is:

1. A process for fabricating an electrolytic cell comprising the steps of:

fabricating a first electrolytic sub-component with a first electrolyte;

fabricating a second electrolytic sub-component with a second electrolyte;

applying an intermediate sub-component connecting layer, comprising an at most partially cured electrolyte, on to one of the first and second electrolytes of the first and second electrolytic sub-components, respectively;

attaching the other of the first and second electrolytic sub-components to the intermediate sub-component connecting layer so that at least a portion of the intermediate sub-component connecting layer is sandwiched between the first and second electrolytes;

orientating the electrolytic cell into a desired configuration while enabling relative sliding between the first and second electrolytic sub-components so as to facilitate operative alignment therebetween; and fully curing the intermediate sub-component connecting layer after the desired configuration and alignment have been obtained to, in turn, maintain the electrolytic cell in the desired configuration after such full curing.

2. The process according to claim 1 wherein the steps of fabricating the first and second electrolytic sub-components further comprise the steps of fabricating at least one of the first and second electrolytic sub-components with an electrolyte which is at most partially cured.

3. The process according to claim 2 further including the steps of:

allowing at least a portion of the intermediate sub-component connecting layer to penetrate into at least a portion of the first and second electrolytes prior to the step of fully curing the intermediate sub-component connecting layer; and curing the at least one of the first and second electrolytes.

4. The process according to claim 1 wherein the first electrolytic sub-component includes an anode and the second electrolytic sub-component includes a cathode.

5. The process according to claim 1 wherein the intermediate sub-component connecting layer comprises an electrolyte having the same composition of at least one of the first and second electrolytes.

6. The process according to claim 1 further including the step of fabricating the intermediate sub-component connecting layer to include a liquid with polymerizable monomers.

7. The process according to claim 1 wherein the intermediate sub-component connecting layer is partially cured prior to the step of applying the intermediate sub-component connecting layer to the one of the first and second electrolytes.

* * * * *